United States Patent [19]

Suzuki et al.

[11] Patent Number: 5,731,039
[45] Date of Patent: Mar. 24, 1998

[54] APPLICATION METHOD FOR SEALANT

[75] Inventors: Mikiko Suzuki, Takasago; Jo Kawamura; Fumio Kawakubo, both of Kobe, all of Japan

[73] Assignee: Kanegafuchi Kagaku Kogyo Kabushiki Kaisha, Osaka, Japan

[21] Appl. No.: 649,340

[22] Filed: May 17, 1996

Related U.S. Application Data

[63] Continuation of Ser. No. 264,506, Jun. 23, 1994, abandoned.

[30] Foreign Application Priority Data

Jun. 24, 1993 [JP] Japan ................................. 5-153442

[51] Int. Cl.$^6$ ........................................................ B05D 3/02
[52] U.S. Cl. .................. 427/387; 427/407.1; 427/412.1
[58] Field of Search ............................... 427/387, 407.1, 427/412.1

[56] References Cited

U.S. PATENT DOCUMENTS 4,981,728  1/1991  Homma et al. ........................ 427/386

*Primary Examiner*—Ralph H. Dean
*Attorney, Agent, or Firm*—Armstrong, Westerman, Hattori, McLeland & Naughton

[57] ABSTRACT

A method applying a curable sealant composition comprising an oxyalkylene polymer having at least one silicon-containing group to the silicon atom of which a hydroxy group and/or a hydrolyzable group are bonded onto previously applied and cured sealant composition comprising an oxyalkylene polymer having at least one silicon-containing group to the silicon atom of which a hydroxy group and/or a hydrolyzable group are bonded, which method comprises applying a primer comprising a copolymer having at least one silicon-containing group to the silicon atom of which a hydroxy group and/or a hydrolyzable group are bonded, said copolymer having a molecular chain comprising substantially (1) a monomer unit of at least one of an alkyl acrylate and an alkyl methacrylate wherein the alkyl group has from 1 to 8 carbon atoms, and (2) a monomer unit of at least one of an alkyl acrylate and an alkyl methA method foracrylate wherein the alkyl group has not less than 10 carbon atoms, which method afford superior adhesiveness between previously applied sealant and newly applied sealant.

12 Claims, 1 Drawing Sheet

APPLICATION METHOD FOR SEALANT

This application is a continuation of application Ser. No. 08/264,506 filed Jun. 23, 1994, now abandoned.

BACKGROUND OF THE INVENTION

The present invention relates to an application method for sealant, and more particularly it relates to an re-application method for a curable oxyalkylene polymer sealant onto previously applied and cured oxyalkylene polymer sealant.

Oxyalkylene polymers containing a silicon-containing group comprising a silicon atom bonded to a terminal group selected from the groups consisting of a hydroxy group and a hydrolyzable group (hereinafter sometimes referred to as a reactive silicon group) and which are thereby capable of crosslinking through siloxane bond formation are disclosed, e.g., in U.S. Pat. No. 3,971,751. Representative of such oxyalkylene polymers is a polymer of the formula:

X'3 Si—(oxypropylene polymer)—SiX'3 wherein X' represents a hydrolyzable group such as a methoxy group.

Oxyalkylene polymers having a reactive silicon group are cured through formation of a siloxane bond (Si—O—Si) among polymer molecules by the action of moisture in the air and the like at room temperature similar to room temperature curable silicone rubbers to thereby provide a rubbery cured product. The cured product of the oxyalkylene polymer has excellent tensile characteristics, such as large elongation, low modulus and high breaking strength, excellent adhesive properties, and excellent paintability on the surface of the cured product and are therefore useful as sealants, adhesives and the like.

With respect to the adhesiveness of oxyalkylene polymer having a reactive silicon group, it can be bonded to a fairly wide range of materials by utilizing various bonding methods and primers containing silane compounds, polyisocyanate resins, mixtures or reaction products of both, or mixtures with other resins. However, when bonding oxyalkylene polymer having a reactive silicon group onto previously applied oxyalkylene polymer having a reactive silicon group after some period has lapsed since application of the previously applied oxyalkylene polymer ("re-application"), a further improvement in the prior art primer compositions is desirable from the viewpoint of the adhesiveness.

SUMMARY OF THE INVENTION

The present invention has been realized in consideration of this kind of problem inherent in the prior art, and accordingly, an object of the present invention is to provide a method which is excellent for re-application purposes.

In accomplishing the foregoing and related objects, the present invention provides a method for applying a curable sealant composition comprising:

providing an applied and cured sealant composition comprising an oxyalkylene polymer having at least one silicon-containing group comprising a silicon atom bonded to a terminal group selected from the groups consisting of a hydroxy group and a hydrolyzable group;

applying a primer to a surface of the applied and cured oxyalkylene polymer, the primer comprising a copolymer having at least one silicon-containing group comprising a silicon atom bonded to a terminal group selected from the group consisting of a hydroxy group and a hydrolyzable group, said copolymer having a molecular chain comprising substantially 1. a monomer unit of at least one of an alkyl acrylate and an alkyl methacrylate wherein the alkyl group has from 1 to 8 carbon atoms, and 2. a monomer unit of at least one of an alkyl acrylate and an alkyl methacrylate wherein the alkyl group has not less than 10 carbon atoms; and applying a sealant composition comprising an oxyalkylene polymer having at least one silicon-containing group comprising a silicon atom bonded to a terminal group selected from the groups consisting of a hydroxy group and a hydrolyzable group to the applied and cured oxyalkylene polymer having the primer thereon.

The method of the present invention is particularly useful when a deteriorated sealant which has been used for many years in building construction is removed and a new sealant is re-applied since it is difficult to completely remove the deteriorated sealant from the substrate in the building construction and usually a small amount of sealant remains on the substrate.

In the present invention, because the primer composition contains a reactive silicon group together with short and long chained alkyl acrylate groups, the primer composition gives superior adhesiveness in the re-application of oxyalkylene polymer sealant onto oxyalkylene polymer sealant compared to conventional primer compositions.

Homma et al disclose in U.S. Pat. No. 4,981,728 that the primer composition comprising a copolymer having at least one silicon-containing group to the silicon atom of which a hydroxyl group and/or a hydrolyzable group are bonded, and having a molecular chain comprising substantially (1) a monomer unit of alkyl acrylate and/or alkyl methacrylate wherein the alkyl group has from 1 to 8 carbon atoms, and (2) a monomer unit of alkyl acrylate and/or alkyl methacrylate wherein the alkyl group has not less than 10 carbon atoms.

However Homma et al do not describe the use of the primer for re-application of a sealant composition containing an oxyalkylene polymer having reactive silicon group.

BRIEF DESCRIPTION OF THE DRAWINGS

These and other aspects of the present invention will become better understood with regard to the following description, appended claims, and accompanying drawings in which:

DETAILED DESCRIPTION OF THE PREFERRED EMBODIMENTS

Figure 1:
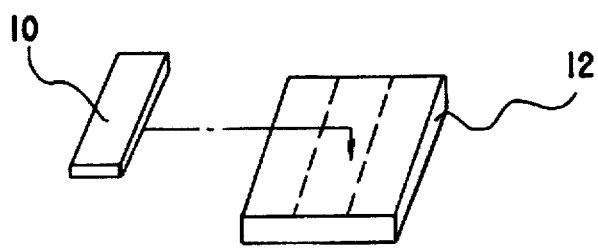
FIGS. 1 to 4 are a series of schematic drawings illustrating the process for making a bonded test body with the application method of the present invention.
Figure 2:
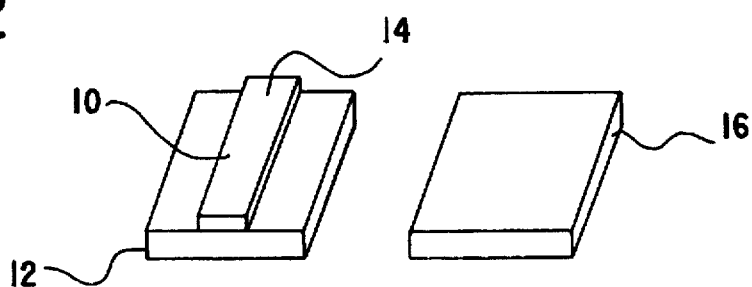

The backbone of the oxyalkylene polymer used in the present invention essentially consists of repeating units of the formula:

—R—O—   (I)

wherein R is a divalent organic group. Preferably, the most of the R groups in the backbone are hydrocarbon groups having 3 or 4 carbon atoms. Specific examples of R are —CH(CH$_3$)CH$_2$—, —CH(C$_2$H$_5$)CH$_2$—, —C(CH$_3$)$_2$CH$_2$—, —CH$_2$CH$_2$CH$_2$CH$_2$— and the like. Among them, —CH(CH$_3$)CH$_2$— is preferable. The backbone of the oxyalkylene polymer may consist of a single kind of the repeating unit or two or more kinds of the repeating units.

The silicon-containing group comprising a silicon atom bonded to a terminal group selected from the groups consisting of a hydroxy group and a hydrolyzable group (reactive silicon group) contained in the oxyalkylene polymer is the well known group and can be crosslinked even at room temperature. A typical example of such group may be represented by the formula:

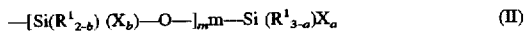  (II)

wherein X is the terminal group selected from the groups consisting of a hydroxyl group and a hydrolyzable group provided that when two or more X groups are present, they may be the same or different, $R^1$ is monovalent hydrocarbon group having 1 to 20 carbon atoms or a triorganosiloxy group of the formula:

$R^2{}_3Si—O—$  (III)

in which $R^2$ is a monovalent hydrocarbon group having 1 to 20 carbon atoms provided that three $R^2$ groups may be the same or different and that when two or more $R^1$ groups are present, they may be the same or different, "a" is 0,1,2 or 3, "b" is 0,1 or 2 provided the sum of "a" and "b" is at least 1, preferably from 2 to 4, and "m" is 0 or an integer of 1 to 19 provided that when "m" is not zreo, the bracketed groups may be the same or different.

Among the reactive silicon group, a group of the formula:

$—Si(R^1{}_{3-n})Xn$  (IV)

wherein X and $R^1$ are the same as defined above and "n" is 1, 2 or 3 preferably, 2 or 3, is preferable.

The oxyalkylene polymer has at least one reactive silicon group, preferably at least 1.1 reactive silicon group, particularly 1.5 to 5 reactive silicon group in a molecule on the average. Preferably, the reactive silicon group is present at the molecular end of the oxyalkylene polymer.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group having 1 to 8 carbon atoms such as methoxy or ethoxy is preferable since it is mildly hydrolyzed and easily handled.

Specific examples of the group $R^1$ are alkyl groups (e.g. methyl, ethyl, etc.), cycloalkyl groups (e.g. cyclohexyl, etc.), aryl groups (e.g. phenyl, etc.), aralkyl groups (e.g. benzyl, etc.), alkenyl groups (e.g. vinyl) and the like.

The oxyalkylene polymer has a number average molecular weight of 500 to 50,000, preferably 3000 to 30,000. The oxyalkylene polymer may be used independently or as admixture of two or more oxyalkylene polymers.

The oxyalkylene polymer having reactive silicon group is usually admixed with various additives before curing. The examples of such additives are a silanol condensation catalyst (a curing accelerator), a plasticizer, a filler, an antisagging agent, a colorant, a stabilizer and the like.

The alkyl (meth) acrylate (the term meaning both acrylate and methacrylate as used hereinafter) unit having an alkyl group with from 1 to 8 carbon atoms, which is a monomer unit of the monomer unit (1) in the alkyl (meth) acrylate copolymer (hereafter, referred to as Copolymer (A)) used in the present invention, is represented by the formula (V):

  (V)

wherein $R^3$ is an alkyl group having from 1 to 8 carbon atoms, and $R^4$ is a hydrogen atom or a methyl group.

The alkyl (meth)acrylate unit which has an alkyl group having not less than 10 carbon atoms which is a monomer unit of the monomer unit (2) in the Copolymer (A) of the present invention is represented by the formula (VI):

$—CH_2—C(R^4)(COOR^5)—$  (VI)

wherein $R^4$ is the same as in the above-mentioned formula (V), and $R^5$ is an alkyl group having not less than 10 carbon atoms.

Examples of $R^3$ in the above-mentioned formula (V) include alkyl groups having from 1 to 8, preferably from 1 to 4, and more preferably from 1 to 2 carbon atoms, such as a methyl group, an ethyl group, a propyl group, n-butyl group, a tert-butyl group, a 2-ethyl hexyl group, and the like. The $R^3$ alkyl group may be a single type of group, or it may be a mixture of two or more types of groups.

Examples of $R^5$ in the above-mentioned formula (VI) include alkyl groups having not less than 10, usually from 10 to 30, and preferably from 10 to 20 carbon atoms, such as a lauryl group, a tridecyl group, cetyl group, a stearyl group, a docosanyl group, and the like. The $R^5$ alkyl group may be, in a manner similar to the case of $R^3$, a single type of group or it may be a mixture of two or more types of groups, such as a mixture of, for example, an alkyl group of 12 carbon atoms and an alkyl group of 13 carbon atoms.

The molecular chain of the above-mentioned Copolymer (A) of the present invention is made substantially of monomer unit (1) and monomer unit (2). Herein, "made substantially of monomer unit (1) and monomer unit (2)" means that the total amount of monomer unit (1) and monomer unit (2) in the Copolymer (A) exceeds 50%, and is preferably not less than 70% of the total amount of the Copolymer (A).

Furthermore, the ratio of monomer unit (1) to monomer unit (2) (monomer unit (1)/monomer unit (2)) is preferably in the range of from 95/5 to 40/60, and more preferably from 90/10 to 60/40.

In the Copolymer (A), in addition to monomer unit (1) and monomer unit (2), monomer units derived from monomers which are copolymerizable with these units may also be included. Specific examples of this kind of additional monomer unit include monomers containing —COOH groups, such as (meth)acrylic acid; amide groups, such as (meth)acrylamide and N-methylol (meth)acrylamide; epoxy groups, such as glycidyl (meth)acrylate; amino groups, such as diethyl amino ethyl (meth)acrylate and aminoethyl vinyl ether; and the like. Other examples include, monomer units derived from acrylonitrile, styrene, α-methyl styrene, alkyl vinyl ether, vinyl chloride, vinyl acetate, vinyl propionate, ethylene, and the like.

From the viewpoint of easy handling, the Copolymer (A) has preferably a number average molecular weight of from 500 to 100,000, and more preferably from 1,000 to 30,000.

The reactive silicon group in the Copolymer (A) are the same as already defined. Concerning the amount of reactive silicon groups in the Copolymer (A), it is preferable that there is an average of from 0.1 to 10 groups, desirably from 0.5 to 5.0 groups, and particularly from 0.5 to 2.5 groups per molecule of the Copolymer (A).

The Copolymer (A) used in the present invention is obtained by vinyl polymerization, for example, by radical polymerization, using normal solution polymerization or block polymerization methods or the like, of monomers which contain monomers providing the units represented by the formulae (V) and (VI).

The reaction is carried out by adding the normal above-mentioned monomers, radical initiator, chain transfer agent, solvent, and so forth, and reacting at a temperature of between 50° C. and 150° C.

Specific examples of the above-mentioned radical initiator are azobisisobutyronitrile, benzoyl peroxide, and the like. Specific examples of the above-mentioned chain transfer agent are n-dodecyl mercaptan, tert-dodecyl mercaptan, and the like. For the solvent it is preferred that non-reactive solvents are used, such as ethers, hydrocarbons, acetates, and the like.

There are various kinds of method to introduce the reactive silicon group into the Copolymer (A). Examples of suitable methods include the following:

(i) A method in which a compound having a polymerizable unsaturated bond and a reactive silicon group (for example, $CH_2=CHSi(OCH_3)_3$) is copolymerized with monomers providing the units represented by the formulae (V) and (VI).

(ii) A method in which a compound having a polymerizable unsaturated bond and a reactive functional group (below, referred to as Y group) (for example, acrylic acid) is copolymerized with monomers providing the units represented by the formulae (V) and (VI), and following this, the generated copolymer having a Y group is reacted with a compound having a functional group reactive with the Y group and a reactive silicon group (for example, a compound having an isocyanate group and a $-Si(OCH_3)_3$ group such as $OCNCH_2CH_2CH_2Si(OCH_3)_3$).

Compounds illustrating the above-mentioned compound having a polymerizable unsaturated bond and a reactive silicon group are represented by the following formula (VII):

$$R^6\text{---}[Si(R^1_{2-b})(X_b)\text{---}O\text{---}]_m\text{---}Si(R^1_{3-a})X_a \qquad (VII)$$

Wherein $R^1$, X, a, b and m are the same as in the above-mentioned formulae. $R^6$ is an organic residue having a polymerizable unsaturated bond.

Among the compounds represented by the formula (VII), compounds represented by the following formula (VIII) are preferred:

$$CH_2=C(R^4) Q Si (CH_3)_{3-n} X_n \qquad (VIII)$$

wherein $R^4$, Y and n are the same as in the above-mentioned formulae, Q is a divalent organic group, such as $-COOR^7-$ (wherein $R^7$ is a divalent alkylene group having from 1 to 6 carbon atoms, such as $-CH_2-$, $-CH_2CH_2-$, and the like), $-CH_2C_6H_5CH_2CH_2-$, $-CH_2OCOC_6H_4COO(CH_2)_3-$, and the like, or a direct bond.

Specific examples of compounds represented by the formulae (VII) or (VIII) include the following:

$CH_2=CHSi (CH_3) (OCH_3)_2$, $CH_2=CHSi (CH_3) Cl_2$, $CH_2=CHSi (OCH_3)_3, CH_2=CHSiCl_3$, $CH_2=CHCOO (CH_2)_2Si (CH_3) (OCH_3)_2$, $CH_2=CHCOO (CH_2)_2 Si (OCH_3)_3$, $CH_2=CHCOO (CH_2)_2 Si (CH_3) Cl_2$, $CH_2=CHCOO (CH_2)_2 Si Cl_3$, $CH_2=C (CH_3) COO (CH_2)_2 Si (CH_3) (OCH_3)_2$, $CH_2=C (CH_3) COO (CH_2)_2 Si (OCH_3)_3$, $CH_2=C (CH_3) COO (CH_2)_3 Si (CH_3) (OCH_3)_2$, $CH_2=C (CH_3) COO (CH_2)_3 Si (OCH_3)_3$, $CH_2=C (CH_3) COO (CH_2)_2 Si (CH_3) Cl_2$, $CH_2=C (CH_3) COO (CH_2)_2 SiCl_3$, $CH_2=CHCH_2 OC (O)-Ph-COO (CH_2)_3 Si (CH_3) (OCH_3)_2$, $CH_2=CHCH_2 OC (O)-Ph-COO (CH_2)_3 Si (OCH_3)_3$, $CH_2=CHCH_2 OC (O)-Ph-COO (CH_2)_3 Si (CH_3) Cl_2$, $CH_2=CHCH_2 OC (O)-Ph-COO (CH_2)_3 SiCl_3$, wherein, Ph is a phenyl group.

As occasion demands, curing catalysts and other additive agents may be added and used in the primer compositions used in the present invention.

As specific examples of this curing catalyst, there are no particular limitations, but normally used silanol condensation catalysts can be used. Specific examples of this kind of curing catalyst are organotin compounds, organotitanate compounds, organoaluminum compounds, organozirconium compounds, amine compounds, acidic phosphate esters, reaction products of acidic phosphate esters with amine compounds, saturated or unsaturated polyvalent carboxylic acids or their acid anhydrides, reaction products of carboxylic acid compounds and amine compounds and the like, lead octylate, and so forth.

Specific examples of the above-mentioned organotin compounds include various types of tin carboxylic acid salt, such as dibutyl tin diacetate, dibutyl tin dilaurate, dibutyl tin maleate, dioctyl tin maleate, dibutyl tin phthalate, tin octylate and tin naphthenate; chelate compounds, such as dibutyl tin diacetylacetonate; reaction products of dibutyl tin methoxide or dibutyl tin oxide with phthalic acid ester; and the like.

Specific examples of the above-mentioned organotitanate compounds include titanic acid ester compounds, such as tetrabutyl titanate, tetraisopropyl titanate, tetrapropyl titanate and triethanolamine titanate; chelate compounds, such as titanium tetraacetylacetonate; and the like.

Specific examples of the above-mentioned organoaluminum compounds include aluminum tris acetylacetonate, aluminum tris ethylacetoacetate, diisopropoxy aluminum ethylacetoacetate, and the like.

Specific examples of the above-mentioned organozirconium compounds include organozirconium compounds such as zirconium tetraisopropoxide and zirconium tetrabutoxide; chelate compounds, such as zirconium tetraacetylacetonate; and the like.

Specific examples of the above-mentioned amine compounds include butylamine, monoethanol amine, triethylene triamine, guanidine, 2-ethyl-4-methylimidazole, 1,8-diazabicyclo(5,4,0) undecene-7 (DBU), and the like.

Furthermore, the above-mentioned acidic phosphate ester is a phosphate ester containing the part:

$$-O-P(=O)(OH)-,$$

examples of which include acidic phosphate esters which are organic acid phosphate esters or the like, illustrated by $$(RO)_d-P(=O)-(OH)_{3-d}$$

(wherein d is 1 or 2, and R is an organic residue). Specific examples of the above-mentioned organic acid phosphate esters include the following:

$(CH_3 O)_2 P (O) OH, (CH_3 O) P (O) (OH)_2$, $(C_2H_5 O)_2 P (O)$, $(C_2H_5 O) P (O) (OH)_2$,
$[(CH_3)_2 CHO]_2 P (O) OH$,
$(CH_3)_2 CHOP (O) (OH)_2$,
$(C_4H_9 O)_2 P (O) OH$, $(C_4H_9 O) P(O)(OH)_2$,
$(C_8H_{17} O)_2 P (O) OH$, $(C_8H_{17} O) P (O) (OH)_2$,
$(C_{10}H_{21} O)_2 P (O) OH$, $(C_{10}H_{21} O) P (O) (OH)_2$,
$(C_{13}H_{27} O)_2 P (O) OH$, $(C_{13} H_{27} O) P (O) (OH)_2$,
$(HOC_8H_{16} O)_2 P (O) OH$, $(HOC_8H_{16} O) P (O) (OH)_2$,
$(HOC_6H_{12} O)_2 P (O) OH$, $(HOC_6H_{12} O) P (O) (OH)_2$,
$[(CH_2 OH) (CHOH) O]_2 P (O) OH$,
$[(CH_2 OH) (CHOH) O]—P (O)—(OH)_2$,
$[(CH_2 OH) (CHOH) C_2H_4 O]_2 P (O) OH$,
$[(CH_2 OH) (CHOH) C_2H_4 O]P (O) OH_2$.

The amount of these curing catalysts used is from about 0 to about 20 parts by weight per 100 parts by weight of the above-mentioned Copolymer (A) having a reactive silicon group.

Examples of additive agents other than those mentioned above, which can be used in the primer compositions of the present invention, include dehydrating agents, adhesion promoting agents, coloring agents, ultraviolet absorbers, antioxidants, solvents, and so forth.

The primer composition used in the present invention is applied in advance to the surface of a substrate to form a dry coating, and can be used as a primer to give excellent adhesiveness between the resulting substrate and sealant when using a sealant containing the oxyalkylene polymer having reactive silicon group. In particular, it is useful as a reapplication primer for bonding oxyalkylene polymer sealant onto oxyalkylene polymer sealant at some period after the first application of the sealant.

The present invention will now be more specifically described and explained by means of the following Examples, in which all parts are by weight. It is to be understood that the present invention is not limited to the Examples, and various changes and modifications may be made in the present invention without departing from the spirit and scope thereof.

SYNTHESIS EXAMPLE 1
Synthesis of a Copolymer (A)

To a mixture of 5.9 g of butyl acrylate, 66 g of methyl methacrylate, 13.2 g of stearyl methacrylate, 5.4 g of γ-methacryloxypropylmethyldimethoxy silane, 7.2 g of γ-mercaptopropylmethyldimethoxy silane and 36 g of toluene was added 3 g of azobisisobutyronitrile as the polymerization initiator. Then this solution was added dropwise to 30 g of toluene which was heated at 110° C., over a period of 6 hours. Following this, the polymerization reaction was carried out for a further 2 hours, to give a Copolymer (A) having a solids content of 60% and a number average molecular weight, by gel permeation chromatography (from a calibration curve obtained using polystyrene standards ), of 2,200.

SYNTHESIS EXAMPLE 2
Synthesis of a Copolymer (A)

To a mixture of 5.7 g of butyl acrylate, 65.1 g of methyl methacrylate, 13.3 g of stearyl methacrylate, 5.1 g of γ-methacryloxypropyltrimehoxy silane, 8.0 g of γ-mercaptopropyltrimethoxy silane and 22 g of xylene was added 3 g of azobisisobutyronitrile as the polymerization initiator. Then this solution was added dropwise to 20 g of xylene which was heated at 110° C., over a period of 6 hours. Following this, the polymerization reaction was carried out for a further 2 hours, to give a Copolymer (A) having a solids content of 70% and a number average molecular weight, by gel permeation chromatography (from a calibration curve obtained using polystyrene standards), of 2,100.

EXAMPLE 1

2 parts of dibutyl tin phthalate were added to 100 parts of the Copolymer (A) obtained in Synthesis Example 1, to give a primer (I).

EXAMPLE 2

2 parts of dibutyl tin phthalate were added to 100 parts of the Copolymer (A) obtained in Synthesis Example 2, to give a primer (II).

COMPARATIVE EXAMPLE 1
Synthesis of a Urethane Primer

A reaction vessel equipped with a condenser and sealed under nitrogen was charged with weighed amounts of 37 g of γ-mercaptopropyltrimethoxy silane (Trade Name: A189, made by Nippon Unicar) and 0.5 g of tin octylate (Trade Name: NEOSTAN U28, made by Nitto Kasei), and while agitating with a magnetic stirrer, 100 g of a polyisocyanate compound having a poiyalkylene oxide unit (Trade Name: TAKENATE M402, made by Takeda Pharmaceutical Industry CO., Ltd.) were added dropwise over a period of about 30 min. After completion of the dropwise addition, agitation was further carried out for about 1 hour, to give a silicon modified polyisocyanate compound.

An agitator-equipped vessel, sealed under nitrogen, was charged with weighed amounts of 1.6 kg of methyl ethyl ketone and 40 g of molecular sieve 3A (made by Union Showa, Ltd.), and under agitation were added 60 g of diallyl phthalate prepolymer (Trade Name: DAISOTAP, made by Osaka Soda, Ltd.) and 15 g of vinylidine chloride resin (Trade Name: SALAN F310, made by Dow Chemical Co.) and these were allowed to dissolve. Following this, 137 g of the above-mentioned silicon modified polyisocyanate compound and 400 g of an aromatic polyisocyanate compound (Trade Name: SUMIJULE HL, made by Sumitomo-Beyer Urethane Co., Ltd.) were added and mixed by agitating, to give a urethane primer (III).

EXAMPLE 3

Figure 3:
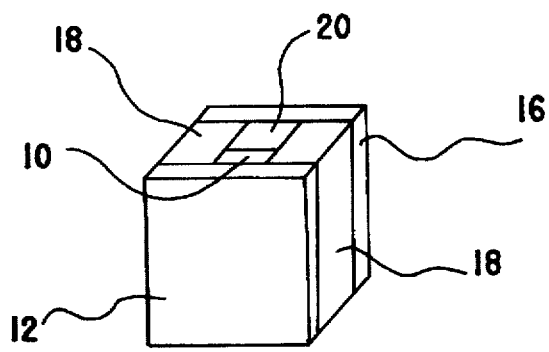
Figure 4:
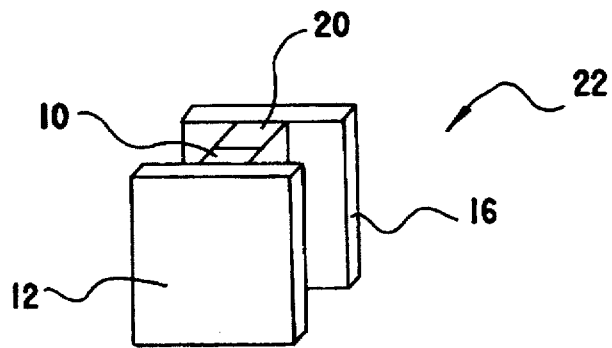

Test bodies were prepared using each of the primers obtained in Example 1 (Primer I) and Example 2 (Primer II) and Comparative Example 1 (Primer III) , by using the following procedure as illustrated in FIGS. 1–4: A 50 mm by 12 mm by 4 mm sample 10 was cut from a sealant containing oxyalkylene polymer having reactive silicon group after 5 years had elapsed from its application. The cut sample 10 was bonded onto an aluminum substrate 12 of dimensions 50 mm by 50 mm by 5mm, as shown in FIG. 1. Then the primer was applied to the face 14 of the sealant sample 10 and also to a separately prepared aluminum substrate 16 treated with methy ethyl ketone, shown in FIG. 2. Using the thus-obtained substrate 12 and 16 and two spacers 18, a No.2 type frame was made according to the regulations of JIS A5758 for tensile adhesiveness testing, and this frame was then filled with new sealant containing an oxyalkylene polymer having reactive silicon group 20, as shown in FIG. 3. The sealant was prepared as follows: 3 parts of tin octylate and 1 part of lauryl amine as a silanol condensation catalyst, 150 parts of colloidal calcium carbonate (Trade Name: CCR, made by Shiraishi Industry Co., Ltd.) as a filler, 65 parts of dioctyl phthalate as a plasticizer, and 1 part of hindered phenol anti-aging agent (Trade Name: NOCLAK NS-6, made by Ouchi Shinko Chemical Co., Ltd.) were added to 100 parts of propylene oxide polymer having a number average molecular weight of 9,600 and having two methyl dimethoxy groups represented by the formula —Si(CH$_3$)(OCH$_3$)$_2$ in the molecule on average. The test frame was left at room temperature for 7 days and then at 50° C. for 7 days to cure and after removal of spacers 18, yielded test body 22, as shown in FIG. 4. Following this, tensile adhesiveness testing was performed on test body 22 at a pulling speed of 50 mm/min, and the 50% modulus (abbreviated as "M50" in kgf/cm$^2$), tensile strength at break (abbreviated as EB in kgf cm$^2$) and degree of elongation at break (abbreviated as EB in %) were measured. The results are shown in Table 1. In Table 1, CF shows cohesive failure and AF shows adhesive failure and CF is preferable to AF.

TABLE 1

|  | Primer (I) | Primer (II) | Primer (III) |
| --- | --- | --- | --- |
| M50 | 1.4 | 1.4 | 1.6 |
| TB | 3.9 | 3.65 | 3.0 |
| EB | 400 | 370 | 230 |
| Failure Position | sealant | sealant | between primer and old sealant |
|  | CF | CF | AF |

From these Examples, it can be seen that with the primer composition used in the present invention it is possible to improve the re-application of a sealant containing oxyalkylene polymer having reactive silicon group.

What is claimed is:

1. A method for applying a curable sealant composition to building construction comprising:

providing an applied and cured sealant composition consisting essentially of an oxyalkylene polymer having at least one silicon-containing group comprising a silicon atom bonded to a terminal group selected from the groups consisting of a hydroxy group and a hydrolyzable group;

removing a main portion of the applied and cured sealant composition;

applying a primer to a surface formed after removing a main portion of the applied and cured sealant composition, the primer comprising a copolymer having at least one silicon-containing group comprising a silicon atom bonded to a terminal group selected form the groups consisting of a hydroxy group and a hydrolyzable group, said copolymer having a molecular chain comprising substantially 1. a monomer unit of at least one of an alkyl acrylate and alkyl methacrylate wherein the alkyl group has from 1 to 8 carbon atoms, and 2. a monomer unit of at least one of alkyl acrylate and alkyl methacrylate wherein the alkyl group has not less than 10 carbon atoms; and applying a sealant composition consisting of an oxyalkylene polymer having at least one silicon-containing group comprising a silicon atom bonded to a terminal group selected from the groups consisting of a hydroxy group and a hydrolyzable group to the surface formed after removing the main portion of the applied and cured sealant having the primer thereon.

2. The method according to claim 1, wherein the silicon-containing group of each of the applied and cured sealant composition, the primer and the sealant composition is a group of the formula:

—[Si (R$^1_{2-b}$) (X$_b$)—O—]$_m$—Si (R$^1_{3-a}$) X$_a$ wherein X is the terminal group selected from the groups consisting of a hydroxy group and a hydrolyzable group, R$^1$ is a monovalent hydrocarbon group having 1 to 20 carbon atoms or a triorganosiloxy group of the formula: R$^2_3$Si—O— in which R$^2$ is a monovalent hydrocarbon group having 1 to 20 carbon atoms provided that three R$^2$ groups may be the same or different, "a" is 0,1,2 or 3, "b" is 0,1, or 2 provided that the total of "a" and "b" is at least 1, and "m" is 0 or an integer of 1 to 19, that when two or more R$^1$ groups are present, they may be the same or different, when two or more X groups are present, they may be the same or different, and the groups in the brackets are not necessarily the same with one another, when "m" is not zero.

3. The method according to claim 1, wherein the terminal group of each of the applied and cured sealant composition, the primer and the sealant composition is a hydrolyzable group and is at least one selected from the group consisting of a hydrogen atom, a halogen atom, an alkoxy group, an acyloxy group, a ketoximate group, an amino group, an amide group, an aminoxy group, a mercapto group, and an alkenyloxy group.

4. The method according to claim 3, wherein the terminal group is an alkoxy group.

5. The method according to claim 4, wherein the terminal group is a methoxy group.

6. The method according to claim 1, wherein the silicon-containing group of each of the applied and cured sealant composition, the primer and the sealant composition is a group of the formula:

—Si(R$^1_{3-n}$) X$_n$ wherein X and R$^1$ are the same as defined above and "n" is 1, 2 or 3.

7. The method according to claim 1, wherein the silicon-containing group of each of the applied and cured sealant composition, the primer and the sealant composition is bonded to an end of the molecule of the oxyalkylene polymer.

8. The method according to claim 1, wherein the oxyalkylene polymer in the sealant composition to be applied has a backbone comprising repeating units of the formula;

—R—O— wherein R is an alkylene group having 2 to 4 carbon atoms.

9. The method according to claim 1, wherein the oxyalkylene polymer in the sealant composition applied and cured has a backbone comprising repeating unit of the formula;

—R—O— wherein R is an alkylene group having 2 to 4 carbon atoms.

10. The method according to claim 8, wherein R is a propylene group.

11. The method according to claim 9, wherein R is a propylene group.

12. The method according to claim 1, wherein the applied and cured sealant composition is a sealant used in building construction.

* * * * *